(12) United States Patent
Dixon et al.

(10) Patent No.: US 7,218,446 B2
(45) Date of Patent: May 15, 2007

(54) IMAGING SYSTEM HAVING A FINE FOCUS

(75) Inventors: Arthur E. Dixon, Waterloo (CA);
Savvas Damaskinos, Waterloo (CA);
Brian Wilson, Toronto (CA)

(73) Assignee: Biomedical Photometrics Inc., Waterloo, Ontario ( * ) Notice: Subject to any disclaimer, the term of this patent is extended or adjusted under 35 U.S.C. 154(b) by 0 days.

(21) Appl. No.: 10/648,450

(22) Filed: Aug. 27, 2003

(65) Prior Publication Data
US 2005/0046936 A1  Mar. 3, 2005

(51) Int. Cl.
*G02B 21/00* (2006.01)
(52) U.S. Cl. .................. 359/379; 359/368; 359/385
(58) Field of Classification Search ............... 359/385, 359/368, 369
See application file for complete search history.

(56) References Cited

U.S. PATENT DOCUMENTS

| | | | | |
|---|---|---|---|---|
| 4,448,498 A * | 5/1984 | Muller et al. | ............... | 359/377 |
| 5,349,443 A * | 9/1994 | Guerra | .................. | 356/600 |
| 5,381,224 A * | 1/1995 | Dixon et al. | ............... | 356/72 |
| 5,386,112 A * | 1/1995 | Dixon | .................. | 250/234 |
| 5,532,873 A * | 7/1996 | Dixon | .................. | 359/388 |
| 6,169,289 B1 * | 1/2001 | White et al. | ............... | 250/458.1 |
| 6,285,019 B1 * | 9/2001 | Engelhardt et al. | ............... | 250/216 |
| 6,370,422 B1 * | 4/2002 | Richards-Kortum et al. | ............... | 600/478 |
| 6,909,540 B2 * | 6/2005 | Engelhardt et al. | ............... | 359/379 |

OTHER PUBLICATIONS

Smith, Warren J., Modern Lens Design, 1992, McGraw-Hill, p. 411.*

* cited by examiner

*Primary Examiner*—Mark A. Robinson
*Assistant Examiner*—Mark Consilvio
(74) *Attorney, Agent, or Firm*—Daryl W. Schnurr

(57) ABSTRACT

A new high resolution confocal and non-confocal scanning laser macroscope is disclosed which achieves fine focus and control of focus position by moving a lens in the intermediate optics. This arrangement is particularly useful for imaging specimens where it is difficult to focus by changing the distance between the scan lens and the specimen, for example for in-vivo imaging, photodynamic therapy, and image-guided surgery. It is also important to keep the lens-to-specimen distance constant when a liquid-immersion scan lens is used, in order to maintain a constant thickness of liquid between the lens and the specimen. In addition to being useful for confocal slicing, motion of the intermediate lens under computer control also enables dynamic focus and the ability to move the focal spot along a general path inside the specimen. Several applications of the imaging system are described. The macroscope images macroscopic specimens in reflected light, transmitted light, fluorescence, photoluminescence and multi-photon fluorescence.

42 Claims, 9 Drawing Sheets

IMAGING SYSTEM HAVING A FINE FOCUS

BACKGROUND OF THE INVENTION

1. Field of the Invention

This invention relates to the fields of confocal and non-confocal imaging of microscopic and macroscopic samples with particular emphasis on scanning beam fluorescence and photoluminescence imaging systems, including multi-photon fluorescence imaging and spectrally-resolved fluorescence imaging. Applications include imaging tissue specimens, genetic microarrays, protein arrays, tissue arrays, cells and cell populations, biochips, arrays of biomolecules, and many others. Other applications of this optical system include photodynamic therapy, image-guided microsurgery, and many others.

2. Description of the Prior Art

FIG. 1 shows one embodiment of a prior art confocal scanning laser macroscope, as described in U.S. Pat. No. 5,760,951. In this embodiment, the incoming laser beam 101 from laser 100 passes through a spatial filter and beam expander (comprised of lens 102, pinhole 104 and lens 106), and is expanded to match the diameter of the entrance pupil 112 of laser scan lens 118 (note—entrance pupil 112 as indicated on the figure simply indicates the position of the entrance pupil. A real stop if not usually placed at this position). Scanning mirrors 110 and 116 deflect the beam in a raster scan, and rotate about axes that are perpendicular to each other. These mirrors are placed close together, on either side of the entrance pupil of the laser scan lens. Laser scan lens 118 focuses the beam to a spot on the sample 120, and reflected light is collected by laser scan lens 118, descanned by scanning mirrors 116 and 110, and partially reflected by beamsplitter 108 into a confocal detection arm comprised of lens 128 and pinhole 130. A detector 132 is located behind the pinhole 130. Light reflected back from the focused spot on the sample passes through pinhole 130 and is detected, but light from any other point in the sample runs into the edges of the pinhole and is not detected. The scan mirrors are computer-controlled to raster the focused spot across the sample. A computer, represented by computer screen 134, is connected to the detector 132 to store and display a signal from detector 132. The computer provides means for displaying the signal from the detector. This confocal macroscope has properties similar to those of a confocal scanning laser microscope, except that the field of view of the microscope is much smaller.

Several other embodiments of the macroscope are presently in use. These include instruments for fluorescence and photoluminescence (including spectrally-resolved) imaging (several other contrast mechanisms are also possible), instruments in which a stage scan in one direction is combined with a beam scan in the perpendicular direction, non-confocal versions, and other embodiments. The combination of a scanning laser macroscope with a scanning laser microscope to provide an imaging system with a wide field of view and the high resolution capability of a microscope was described in U.S. Pat. No. 5,532,873.

The prior art macroscopes described herein and in the literature have some limitations. When focusing the instrument on a specimen, either to achieve best focus or for confocal slicing, focus position is achieved by changing the distance between the specimen and the laser scan lens. This is usually accomplished by raising or lowering the specimen on an adjustable or motorized specimen stage, or by raising or lowering the laser scan lens (or the macroscope itself) relative to the specimen. Some specimens are difficult to move, or too large to be placed on a specimen stage (one example is the human body, when the instrument is used for in-vivo imaging). This makes fine focus motion difficult to accomplish, and in the case of a macroscope using a liquid-immersion laser scan lens, changes the distance between the scan lens and the specimen, making it difficult to maintain a uniform layer of immersion fluid between the scan lens and specimen.

SUMMARY OF THE INVENTION

It is an object of this invention to provide a confocal or non-confocal imaging system for macroscopic samples in which the coarse focus is achieved by moving the sample and the laser scan lens relative to one another, and fine focus (or confocal slicing) is achieved by adjusting the position of a lens in the intermediate optics (note could use reflecting intermediate optics as well). This will be particularly important for in-vivo imaging including using a macroscope containing a liquid-immersion laser scan lens for in-vivo imaging.

It is an object of this invention to provide a confocal or non-confocal imaging system for macroscopic samples in which the coarse focus is achieved by moving the sample and the laser scan lens relative to one another, and dynamic fine focus is achieved by adjusting the position of a lens in the intermediate optics while the scan is underway.

It is a further object of this invention to provide an instrument that controls the position of the moving focused laser spot (volume) to move it along a previously defined path inside a sample volume defined by the area of the field of view of the laser scan lens in two dimensions and the range of axial fine focus in the third (perpendicular) direction achieved by moving a lens in the intermediate optics.

It is a further object of this invention to provide an apparatus and method for performing image-guided microsurgery using a laser for cutting (excising, ablating or resecting) tissue.

It is a further object of this invention to provide an apparatus and method for performing image-guided microsurgery using a short pulse laser to generate multi-photon absorption for cutting (excising, ablating or resecting) tissue.

It is a further object of this invention to provide an apparatus and method for image-guided photodynamic therapy.

It is a further object of this invention to provide a scanning beam optical instrument for multi-photon fluorescence imaging.

It is a further object of this invention to provide an apparatus and method for exciting a small volume inside a semiconductor specimen (including a semiconductor device) for optical beam induced current generation, or device repair or testing.

It is a further object of this invention to provide an apparatus and method for exciting a small volume inside a semiconductor specimen (including device) for device repair or testing or optical beam induced current generation using a short pulse laser that results in multi-photon (or two photon) absorption at the focus volume inside the semiconductor.

DESCRIPTION OF A PREFERRED EMBODIMENT

When the word "object" is used in the present application, it includes any subject that is used with an optical imaging system or with a liquid immersion scan lens including, without limiting the generality of the foregoing, a sample, specimen, body or subject including living organisms or parts of a body or subject. The liquid imaging system of the present invention can be used for in-vivo applications.

The present invention is a high-resolution confocal, non-confocal or multi-photon scanning laser macroscope in which coarse focus is achieved by moving the specimen relative to the macroscope scan lens, and fine focus is achieved by moving a lens in the intermediate optics. In a scanning laser macroscope, focus is usually achieved by moving the specimen relative to the scan lens, or moving the scan lens (or the entire macroscope optical subassembly) relative to the specimen. Some specimens are difficult to move, or too large to be placed on a specimen stage (one example is the human body, when the instrument is used for in-vivo imaging). This makes fine focus motion difficult to accomplish, and in the case of a macroscope using a liquid-immersion laser scan lens, changes the distance between the scan lens and the specimen, making it difficult to maintain a uniform layer of immersion fluid between the scan lens and specimen. In addition, it is easier to obtain rapid focus changes by moving a small lens than by moving the larger scan lens or the specimen stage, and fine focus automation can be obtained by controlling the position of the intermediate focusing lens using a motorized stage. With such motion control, dynamic focus can be achieved for imaging, or the focused laser spot can be moved along any line inside the three-dimensional volume defined by the scan area and the axial fine focus distance. Confocal slicing can also be accomplished by moving the focusing lens on a computer-controlled stage.

Figure 1:
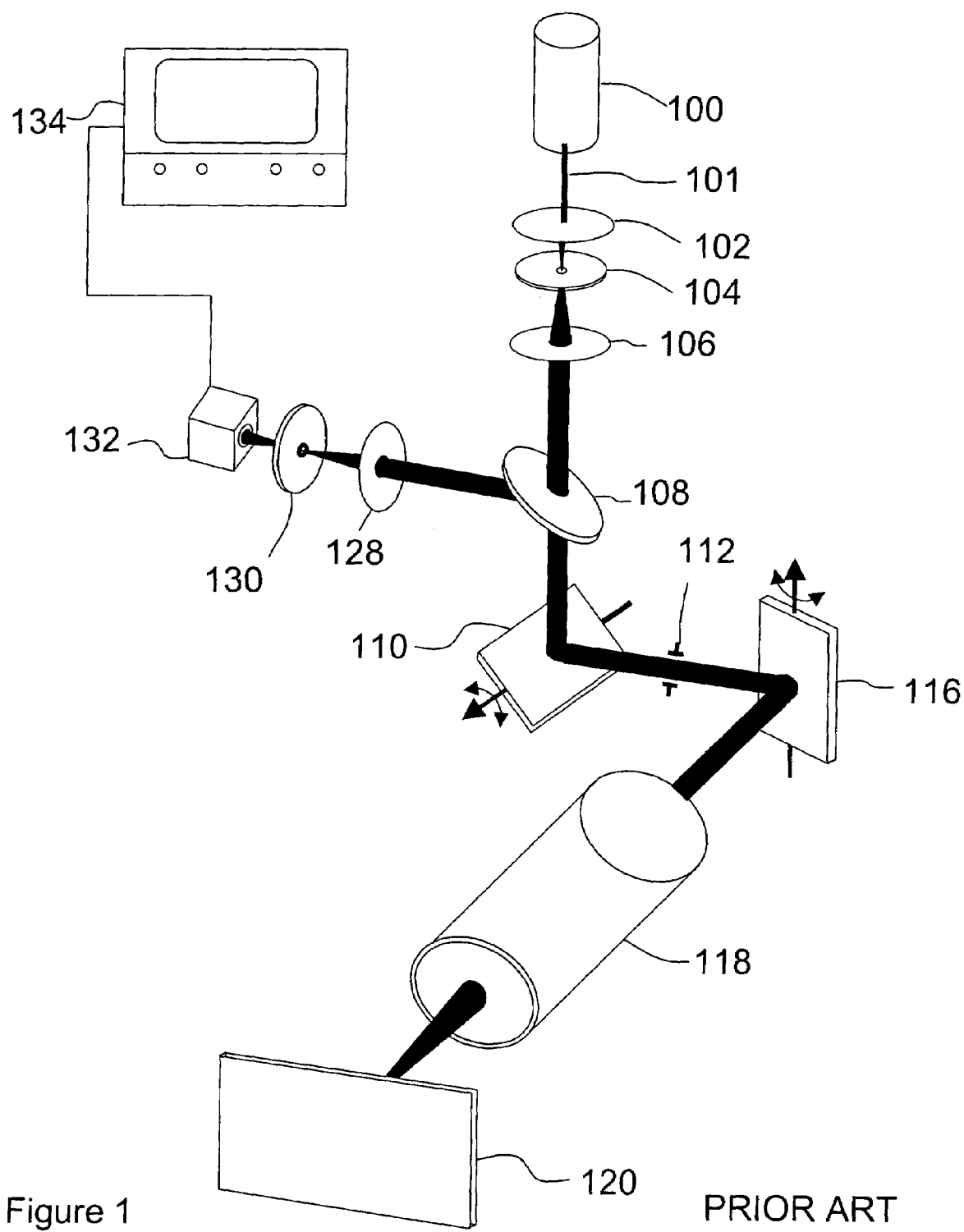
FIG. 1 is a schematic view of a prior art confocal scanning-beam optical macroscope.
Figure 2A:
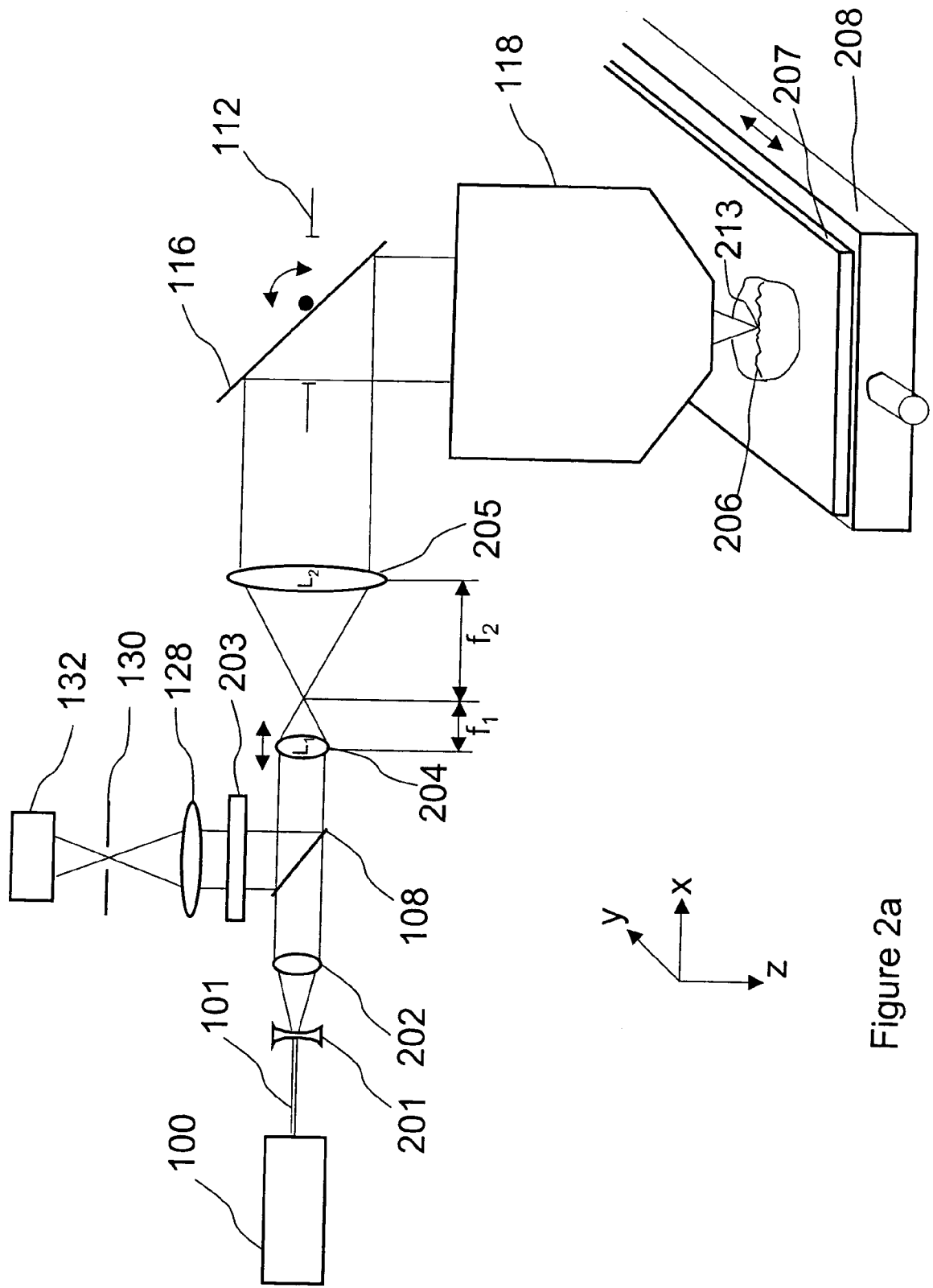
FIG. 2a is a schematic view of a confocal macroscope having a fine focus control.

The optical diagram of a scanning beam-scanning stage confocal scanning laser macroscope using a movable lens in the intermediate optics for focusing is shown in FIG. 2a. Light beam 101 from laser 100 (or other light source) is expanded by a first beam expander comprised of lenses 201 and 202, passes through beamsplitter 108 and enters a second beam expander comprised of lenses 204 and 205 (lenses $L_1$ and $L_2$, with focal lengths $f_1$ and $f_2$). The combination of first and second beam expanders expand the light beam to fill the entrance pupil 112 of the laser scan lens 118; when the light beam from laser 100 is large enough (more than about a few millimeters in diameter), the first beam expander is not required. Note that a real stop is not required at the entrance pupil position—112 simply indicates the size and position of the external entrance pupil of scan lens 118. The incoming beam is directed toward scan lens 118 by scanning mirror 116. Scan lens 118 focuses the incoming beam onto specimen 206, shown mounted on a microscope slide 207. Microscope slide 207 is mounted on scanning stage 208. In this scanning beam-scanning stage configuration, a raster scan of the focus spot 213 across the surface of specimen 206 is achieved by scanning the beam in the x direction using scanning mirror 116 and moving the specimen slowly in the y direction using the scanning stage 208. Other scan mechanisms are possible, including the scanning beam arrangement shown in FIG. 1 and other scan mechanisms. Light emitted from, or reflected by, specimen 206 at the focal point 213 is collected by scan lens 118, descanned by scanning mirror 116, passes back through lenses 205 and 204, and is reflected by beamsplitter 108 into a detection arm comprised of filter 203, detector lens 128 and pinhole 130. A detector 132 is located behind the pinhole 130. For fluorescence imaging, a beamsplitter 108 is usually a dichroic beamsplitter, and filter 203 is a laser rejection filter. Beamsplitter and filter combinations depend on the application. In some applications (e.g. reflected light), no filter 203 is required.

The macroscope shown in FIG. 2a has a scanning-beam/scanning-stage configuration. Beam scanner 116 moves the focus spot in the x-direction, while scanning stage 208 moves the specimen in the y-direction.

Lens 204 has been mounted so that it can be moved in the axial direction. When moved to the right (in the figure) from it's nominal position, the expanded beam on the right of lens 205 will be diverging, causing the scan lens 118 to focus below its nominal focus position. When lens 204 is moved to the left, the expanded beam on the right of lens 205 will be converging, causing the scan lens to focus above its nominal focus position. Coarse focus of the instrument is achieved by changing the distance between the scan lens 118 and the sample 206. Fine focus of the instrument is achieved by moving lens 204 relative to the scan lens 118. Focus could also be changed by moving lens 205; however it is preferable to move lens 204 because it is smaller. Because lens 204 is small, it can be controlled to move rapidly, and this can be used for dynamic focusing while the scan proceeds. This is particularly important when large samples are used (one example is the imaging of cracks and corrosion on metal parts), or for in-vivo imaging where it is difficult to quickly change focus by moving the patient or the scan lens. In-vivo imaging will most likely be performed using a scanning-beam/scanning-beam instrument.

The macroscope shown in FIG. 2a is well suited for imaging genetic microarrays and for tissue and cell imaging, including tissue and cell arrays. When very high resolution is required, the depth of focus of the instrument is small, and dynamic focus can be achieved by moving lens 204 rapidly on a motorized stage under computer control. For example, if a genetic microarray on a glass microscope slide must be imaged at high resolution, without dynamic focus correction the macroscope tends to go out of focus as the scan moves across the width of the microscope slide. Dynamic focus can be achieved by controlling the position of lens 204 as the scan proceeds, and since lens 204 has a small mass, it is much easier to achieve rapid motion of lens 204 than to rapidly move scan lens 118 or microscope slide 207.

Figure 2B:
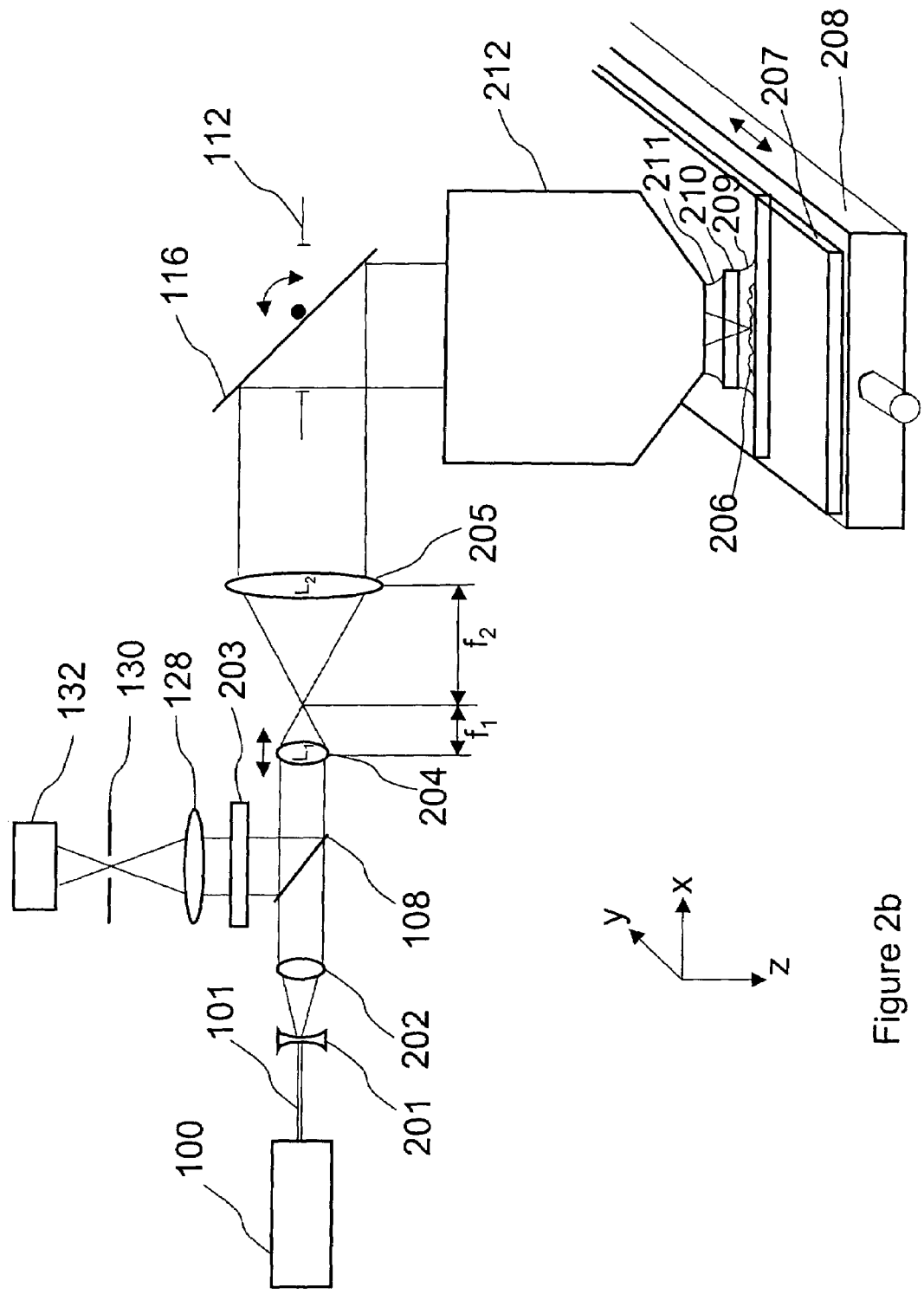
FIG. 2b is a schematic view of a confocal macroscope having a liquid immersion lens with a fine focus control.

FIG. 2b illustrates a scanning laser macroscope that is similar to that shown in FIG. 2a, except that the laser scan lens 118 has been replaced by a liquid-immersion laser scan lens 212. In this figure the specimen 206 is mounted in mounting medium 209 under cover glass 210 and the space between the cover glass and the bottom element of scan lens 212 is filled with immersion fluid 211. The immersion fluid is chosen to have an index of refraction that matches (or nearly matches) the index of refraction of the mounting medium, cover glass and the bottom lens element in the scan lens. Fine focus using a focusing lens in the intermediate optics is particularly important in this case, where a thin film of immersion fluid must be maintained between the scan lens and the cover glass. This is much more difficult to accomplish if the distance between the laser scan lens and specimen changes during focusing.

Figure 3A:
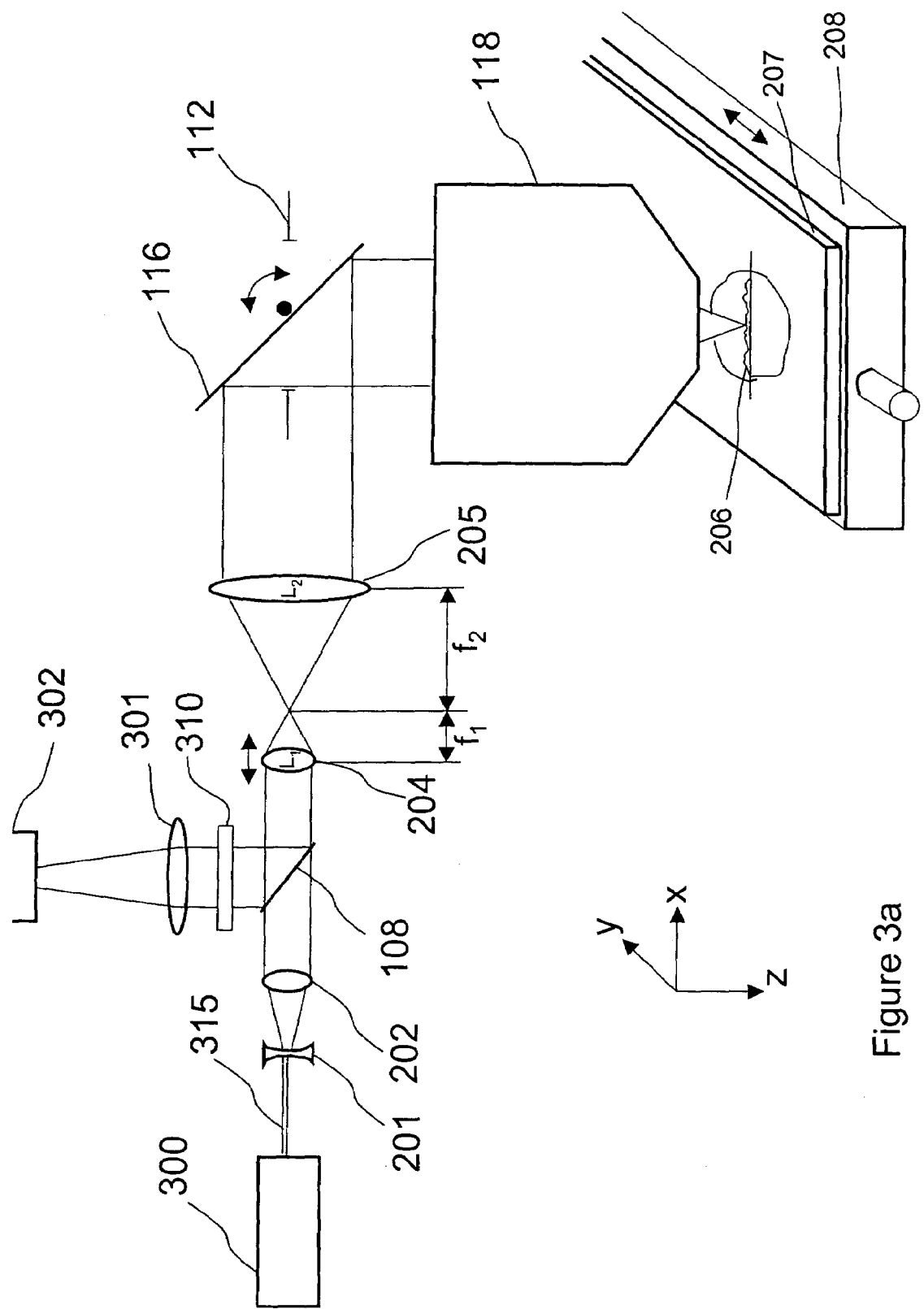
FIG. 3a is a schematic view of a multi-photon macroscope having a fine focus control.

FIG. 3a illustrates a two-photon (or multiphoton) macroscope. Light beam 315 from Short Pulse Laser 300 (a picosecond or femtosecond or other short pulse laser) is expanded by a beam expander comprised of lens 201 and lens 202, passes through a beamsplitter 108 (a Dichroic beamsplitter is often used), is expanded by a beam expanding telescope comprised of lenses 204 and 205 to fill the entrance pupil 112 of scan lens 118, is scanned by scanning mirror 116, and focused by laser scan lens 118 to a focal spot on specimen 206. Two-photon (or multiphoton) fluorescence from the specimen (not shown) at the focal spot is collected by scan lens 118, descanned by scanning mirror 116, passes back through the telescope and is reflected by beamsplitter 108 into a detection arm comprising laser line rejection filter 310 and condenser lens 301. A detector 302 is located behind the condenser lens 301 (any filter can be used in place of the filter 310 as long as it rejects the laser wavelength and passes the fluorescence wavelengths). Note that no confocal pinhole is required since two-photon (or multi-photon) fluorescence is excited only near the focus point of the short pulse laser. If the active area of detector 302 is large enough to intercept all of the light in the returning beam, no condenser lens is required. Lens 204 has been mounted so that it can be moved in the axial direction relative to the scan lens 118. When moved to the right (in the figure) from it's nominal position, the expanded beam on the right of lens 205 will be diverging, causing the scan lens 118 to focus below its nominal focus position. When lens 204 is moved to the left, the expanded beam on the right of lens 205 will be converging, causing the scan lens to focus above its nominal focus position. Coarse focus of the instrument is achieved by changing the distance between the scan lens 118 and the sample 206. Fine focus of the instrument is achieved by moving lens 204 relative to the scan lens 118. Focus could also be changed by moving lens 205; however it is preferable to move lens 204 because it is smaller. Because lens 204 is small, it can be controlled to move rapidly, and this can be used for dynamic focusing while the scan proceeds. This is particularly important when large samples are used (one example is the imaging of cracks and corrosion on metal parts), or for in-vivo imaging where it is difficult to quickly change focus by moving the patient or the scan lens. In-vivo imaging will most likely be performed using a scanning-beam/scanning-beam instrument.

The scan lens 118 shown in FIG. 3a uses no immersion fluid; however a water-immersion (or other immersion fluid) scan lens can also be used, and the increased NA of the immersion lens will increase the intensity of the light at the focus, thus improving two-photon (or multiphoton) absorption and fluorescence detection.

Figure 3B:
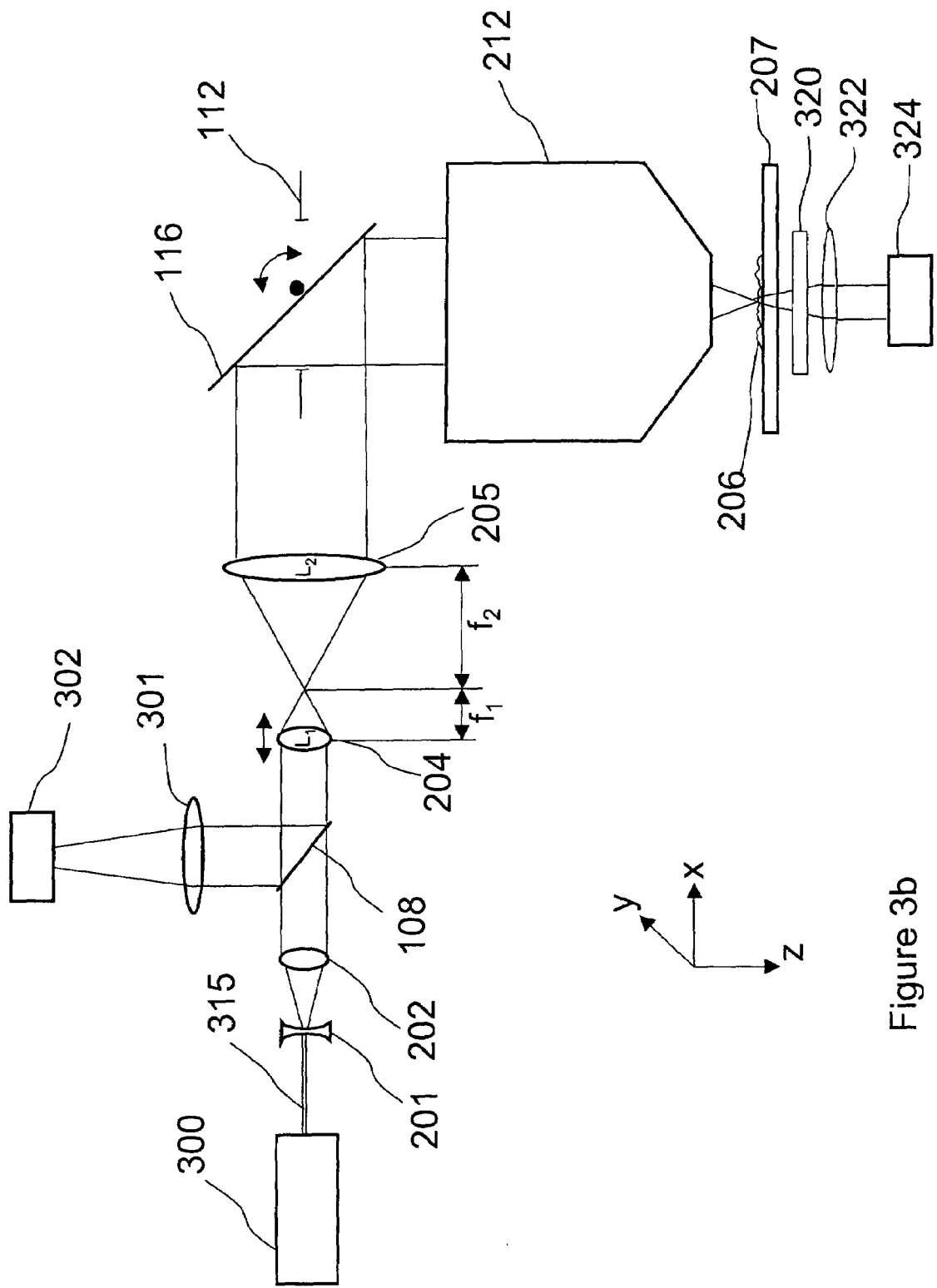
FIG. 3b is a schematic view of a multi-photon macroscope with a transmission detector and a fine focus control.

FIG. 3b illustrates a two-photon (or multiphoton) macroscope with a transmission detector for transmitted light or multi-photon fluorescence, with fine focus adjustment by moving a lens in the intermediate optics. In this embodiment light transmitted through specimen 206 (or multi-photon fluorescence emitted by specimen 206) is detected in a detection arm below the specimen. Condenser lens 322 collects light from the focal spot in the specimen, and directs it towards detector 324. If condenser lens 322 is placed a distance equal to its focal length below the focal plane of the macroscope, and a distance equal to its focal length in front of detector 324, then the cone of light originating at the focal spot will be a parallel beam directed towards the center of detector 324, reducing the motion of the incoming light across the surface of the detector. Condenser lens 322 works well if it has a short focal length and large diameter. It has been found that Fresnel lenses work well in this application. For detecting multi-photon fluorescence, a laser line rejection filter 320 is placed between the specimen and the detector. In some applications, detector 324 replaces detector 302 entirely. In others (for example, when the fluorescence wavelengths will not penetrate through a thick specimen) detector 302 will be required. Note that this transmission arm arrangement, comprised of laser line rejection filter 320 (or other filter, depending on the application), condenser lens 322 and detector 324 can also be used for detecting non-confocal transmission or fluorescence with the confocal macroscopes described earlier, and in FIGS. 4a and 4b below.

Figure 4A:
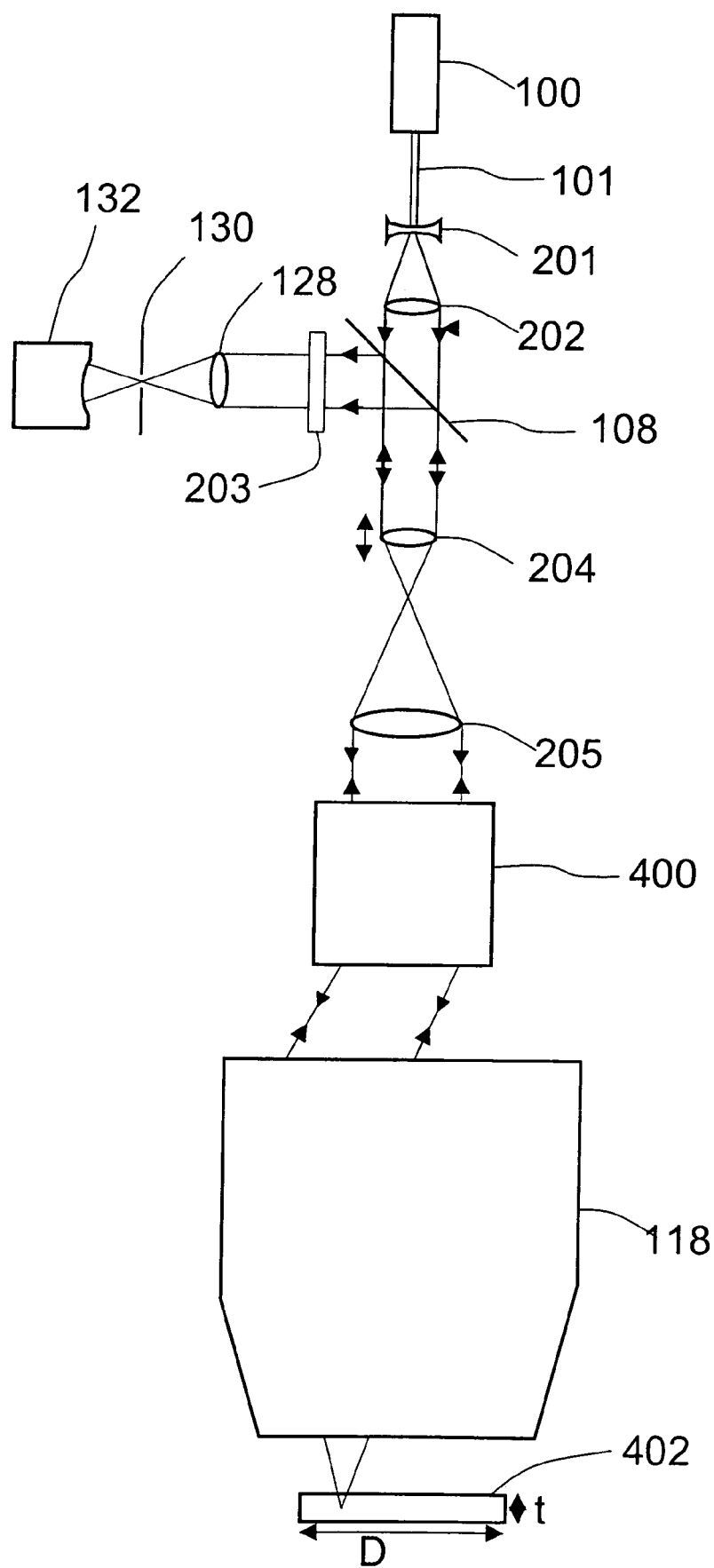
FIG. 4a is a schematic view of a confocal scanning laser macroscope having a fine focus control.

FIG. 4a illustrates a confocal scanning laser macroscope that is similar to that shown in FIG. 2a, except the scanning-beam/scanning-stage configuration of FIG. 2a has been replaced by a general purpose scanner 400. This is meant to illustrate that many kinds of scan combinations are possible—scanning-beam/scanning-beam as shown in FIG. 1, scanning-beam/scanning-stage as in FIG. 2a, or any other scanner that results in a raster scan of the focused laser beam across the specimen. The incoming beam can be focused at any point inside the "sampling volume" 402 of volume $D^2 t$ by moving lens 204 (or lens 205) away from its nominal position a distance $f_1+f_2$ from lens 205, without moving either laser scan lens 118 or the specimen relative to one another. This enables the macroscope to form an image of any sample plane inside this sampling volume, and by controlling the scan using scanner 400 and the focus position using lens 204, the focused spot can be moved to follow any path inside that volume. This embodiment can be used for several applications, including but not limited to image-guided surgery, image-guided microscopy, image-guided photo dynamic therapy, photoluminescent testing of semiconductor materials and devices, optical-beam-induced-current testing of devices, and two-photons absorption (to create electron-hole pairs or to create defects or repair defects below the surface of the sample) in semiconductor materials and devices or for irradiating a specific area for photo dynamic therapy. The scan lens 118 shown in FIG. 4a uses no immersion fluid; however a water-immersion (or other immersion fluid) scan lens can also be used.

Figure 4B:
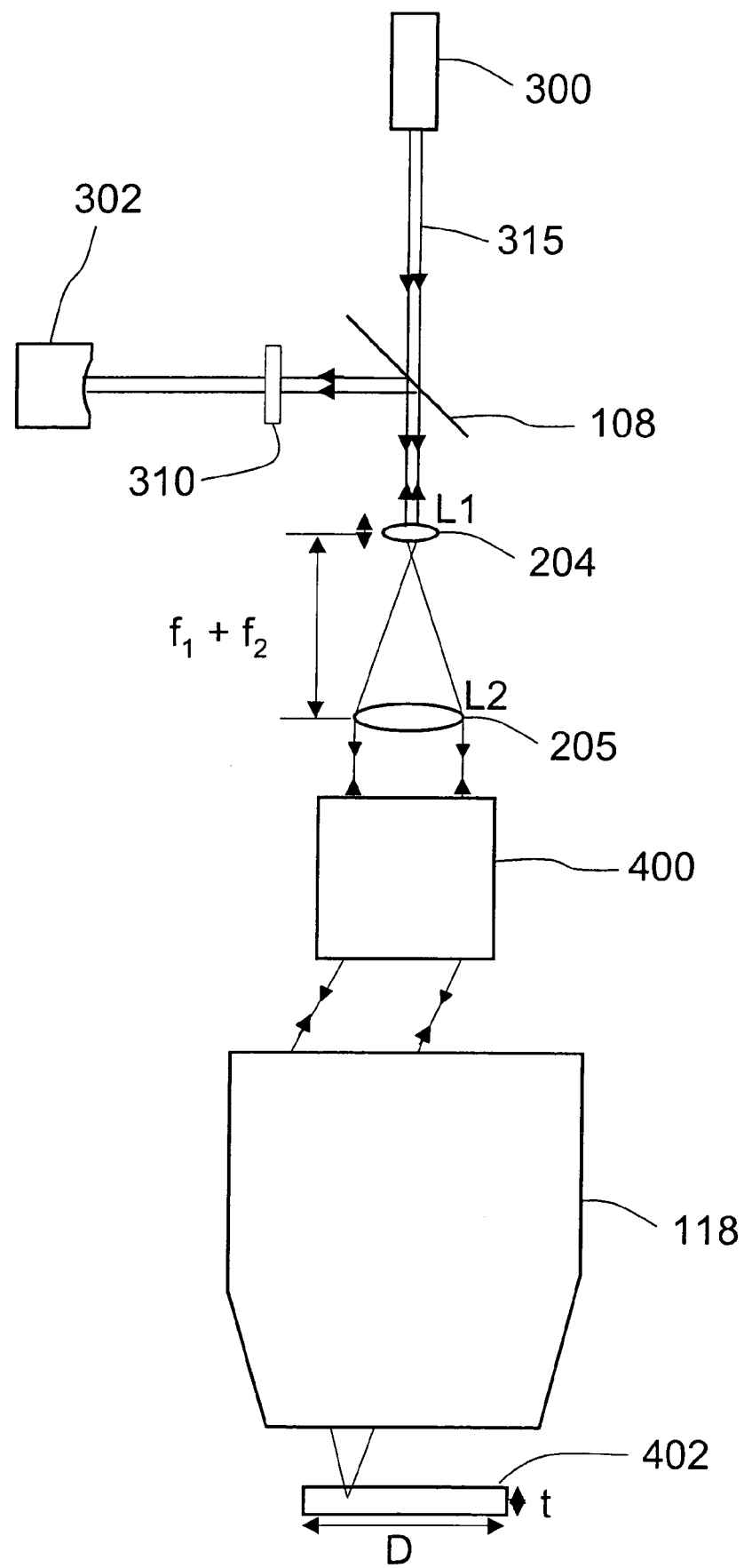
FIG. 4b is a schematic view of a multi-photon scanning laser having a fine focus control.

FIG. 4b illustrates a multi-photon scanning laser macroscope that is similar to that shown in FIG. 3a, except the scanning-beam/scanning-stage configuration of FIG. 3a has been replaced by a general purpose scanner 400. This is meant to illustrate that many kinds of scan combinations are possible—scanning-beam/scanning-beam as shown in FIG. 1, scanning-beam/scanning-stage as in FIG. 2a, or any other scanner that results in a raster scan of the focused laser beam across the specimen. The incoming beam can be focused at any point inside the "sampling volume" 402 of volume $D^2 t$ by moving lens 204 (or lens 205) away from its nominal position a distance $f_1+f_2$ from lens 205, without moving either laser scan lens 118 or the specimen relative to one another. This enables the macroscope to form an image of any sample plane inside this sampling volume, and by controlling the scan using scanner 400 and the focus position using lens 204, the focused spot can be moved to follow any path inside that volume. This embodiment can be used for several applications, including but not limited to, image-guided microsurgery, image-guided photo dynamic therapy, photoluminescence testing of semiconductor materials and devices, optical-beam-induced-current testing of devices, and two-photon absorption (to create electron-hole pairs or to repair or create defects below the surface of the sample) in semiconductor materials and devices, or for irradiating a specific area for photo dynamic therapy. The scan lens 118 shown in FIG. 4b uses no immersion fluid; however a water-immersion (or other immersion fluid) scan lens can also be used, and the increased NA of the immersion lens will increase the intensity of the light at the focus, thus improving two-photon (or multiphoton) absorption and two-photon (or multiphoton) fluorescence detection. One particularly useful embodiment for use in surgical applications, or for in-vivo imaging, is a macroscope with this design in which the scan lens 118 is designed to work with water as an immersion fluid, and the volume $D^2t$ includes the tissue volume to be imaged and/or cut.

Figure 5A:
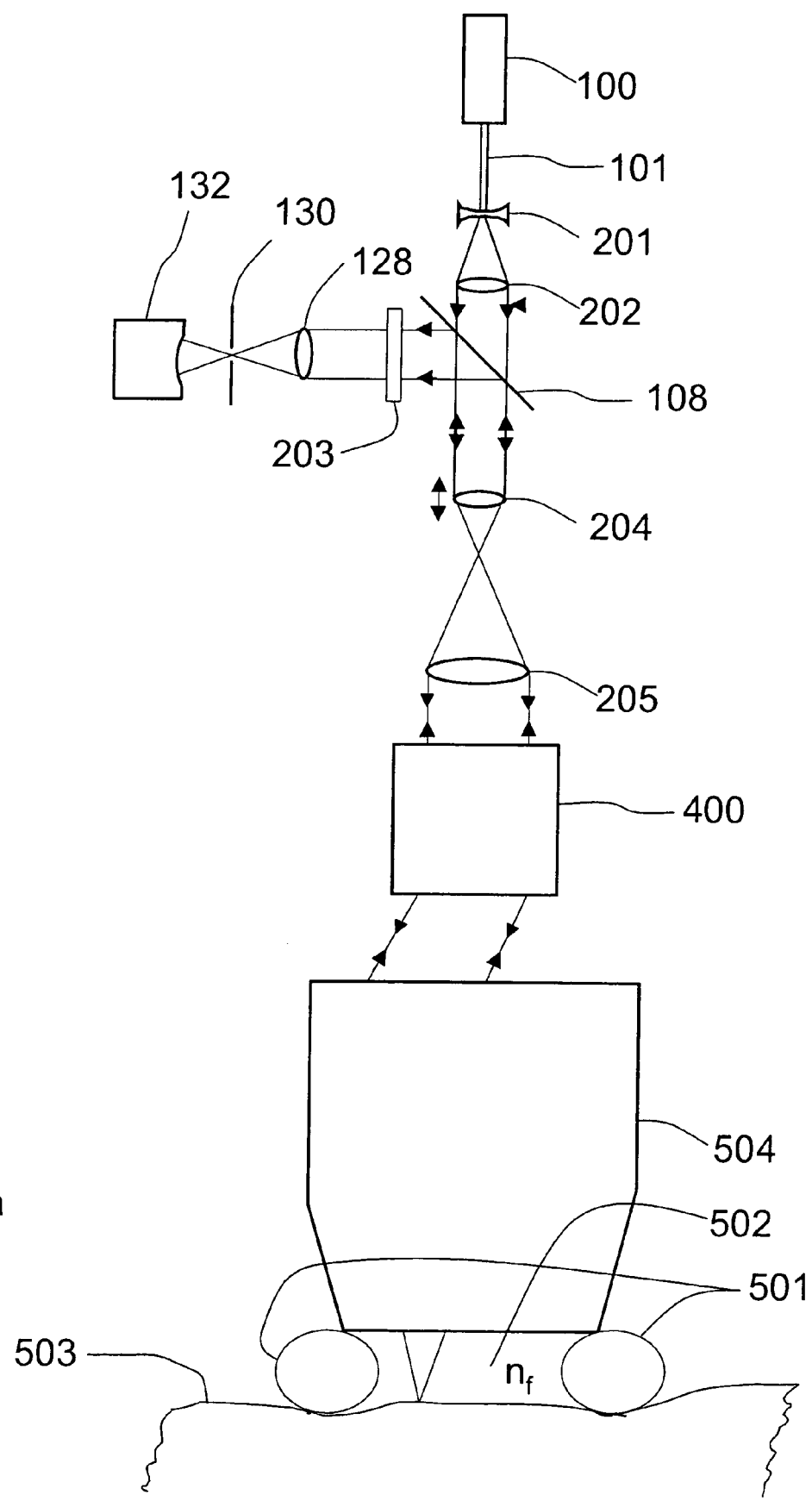
FIG. 5a is a schematic view of a confocal scanning laser macroscope having a liquid immersion scan lens and a flexible dam with a fine focus control.

FIG. 5a shows a confocal macroscope that is optimized for in-vivo applications. This macroscope is similar to that shown in FIG. 4a except scan lens 118 has been replaced by immersion scan lens 504, and immersion fluid 501 (usually water) of index of refraction $n_f$ is contained inside a flexible dam 501 (a soft rubber or plastic O-ring can be used). The flexible dam forms a barrier to contain the immersion-fluid between the bottom of lens 504 and the surface of specimen 503. Although the focus position is shown at the surface of specimen 503, the focus position of this macroscope can be adjusted by moving lens 204 such that any focus position inside the imaging volume $D^2t$ can be reached, including areas inside the specimen 503 that are within the penetration depth of the laser beam. The use of an immersion scan lens results in higher resolution imaging (because of the higher NA of the immersion lens) and higher sensitivity for fluorescence imaging. For in-vivo applications, the instrument is used in reflectance and/or fluorescence mode, or a combination of the two.

Figure 5B:
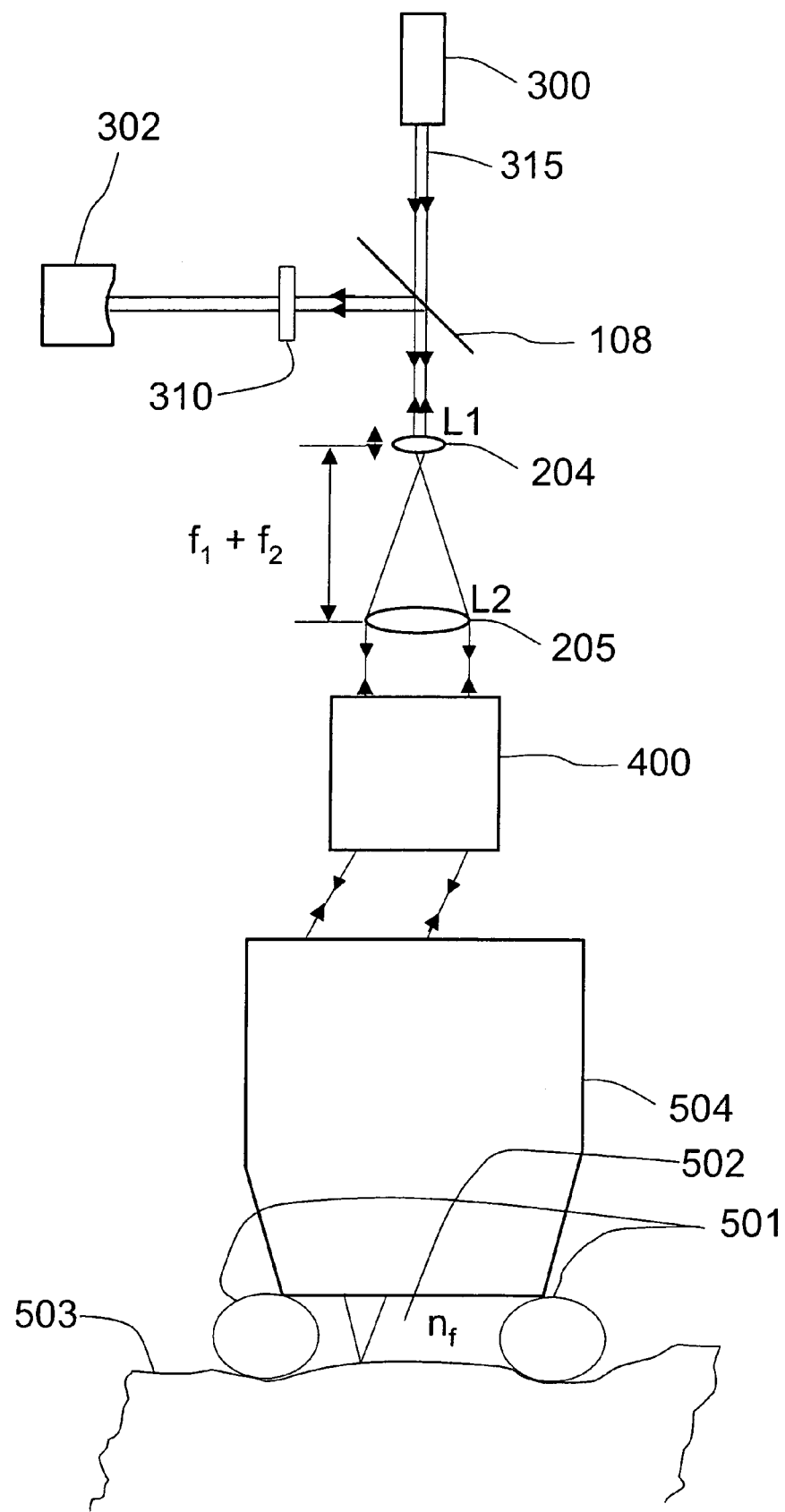
FIG. 5b is a schematic view of a multi-photon scanning laser macroscope having a liquid immersion scan lens and a flexible dam with a fine focus control.

FIG. 5b shows a multi-photon macroscope that is optimized for in-vivo applications. This macroscope is similar to that shown in FIG. 4b except scan lens 118 has been replaced by immersion scan lens 504 and immersion fluid 501 (usually water) of index of refraction $n_f$ is contained inside a flexible dam 501 (a soft rubber or plastic O-ring can be used). The flexible dam forms a barrier to contain the immersion fluid between the bottom of lens 504 and the surface of specimen 503. Although the focus position is shown at the surface of specimen 503, the focus position of this macroscope can be adjusted by moving lens 204 such that any focus position inside the imaging volume $D^2t$ can be reached, including areas inside the specimen 503 that are within the penetration depth of the laser beam. Because of its higher NA (for the same field of view), and immersion scan lens increases the intensity of the light at the focus, thus improving two-photon (or multiphoton) absorption and fluorescence detection. This embodiment is particularly useful for several applications, including, but not limited to, in-vivo imaging, image-guided surgery, image-guided microsurgery, image-guided photo dynamic therapy, image-guided surgery and in-vivo multi-photon fluorescence imaging.

When used for fluorescence imaging of tissue, the macroscopes described herein can be used for tissue autofluorescence or with fluorescence agents, including but not limited to fluorescent dyes either alone or linked to a targeting/delivery vehicle or quantum dots (fluorescent nanoparticles).

The macroscope described herein can be used for fluorescence excitation and emission, and reflection in the ultraviolet, visible and near-infrared wavelength ranges.

The macroscope described herein can be used for multi-spectral or hyperspectral imaging, in either reflectance or fluorescence mode, by replacing the detector by a spectrally-resolved detector. Multi-spectral or hyperspectral measurements can be made at any point by stopping the scan at that point. Several implementations of spectrally-resolved detectors in a scanning laser microscope are shown in U.S. Pat. No. 5,192,980, and these implementations will also work in the macroscopes described herein. In reflectance, spectral analysis can extract information on morphological features of cells and tissues. In fluorescence, spectral analysis will enable the extraction of information on the structural and/or biochemical nature of the tissue. Correction for autofluorescence background can be made in hardware or software.

Both the fluorescence spectra and the lifetimes of fluorophores are sensitive to their local environment, and thus changes in emission spectrum or lifetime as a function of position provide contrast mechanisms that can be used to differentiate between normal, pre-cancerous and cancerous tissue. The macroscopes described herein can be modified for fluorescence lifetime imaging by modulating the light source at a high frequency and using a lock-in amplifier to detect the phase shift and amplitude of the fluorescence emission signal compared to the excitation light.

Both confocal and multi-photon macroscopes are useful for photodynamic therapy, both for delivery of the light beam to the area of therapy and image guidance for that delivery, and for monitoring treatment after therapy. In the cases of image guidance and treatment monitoring, the light-based treatment may or may not be delivered through the macroscope optical system.

The macroscopes described herein will be useful for photoluminescence imaging and optical beam induced current imaging or testing of semiconductor materials and devices. In particular, the multi-photon macroscope, using an infrared laser with photon energy smaller than the semiconductor bandgap energy, can penetrate deeply into a semiconductor and either create a small volume of electron-hole pairs inside the sample, which can be used to test complicated three-dimensional circuits by injecting charge near a device junction, or, when more intense beams are used, can effect repairs or cause disconnects in the circuitry.

All of the embodiments shown in the figures are based on an infinity-corrected optical design, however non-infinity corrected versions are also possible. Non-telecentric scan lenses can also be used. The light source shown is a laser however other light sources can also be used, including arc lamps and light-emitting diodes. A white light source will be useful in some applications, including brightfield imaging of tissue specimens. Reflecting optics can also be used.

The term scan lens, as used in this document, describes a lens that is normally used for focusing a parallel beam of light to a small spot that scans across the focal plane. The incoming parallel beam is usually directed by a scanner placed at the position of the entrance pupil of the scan lens. Such a lens has a combination of wide angular field, a flat image plane, and an external entrance pupil (at which position a scanning mirror or other scanner is often placed). Although many laser scan lenses are monochromatic, color-corrected scan lenses are most useful in the applications described herein. Many scan lenses include f*theta correction and many are telecentric.

Several embodiments of a novel high-resolution scanning optical macroscope for imaging microscopic and macroscopic specimens have been disclosed. In one embodiment, the imaging system has a laser light source that is adjustable and controllable to enable said imaging system to perform at least one of image guided microsurgery, image guided surgery, microsurgery, image guided photo-dynamic therapy, multi-photon fluorescence imaging or to excite a small volume inside a semi-conductor.

Having described preferred embodiments of a new scanning optical macroscope for imaging microscopic and macroscopic specimens, constructed in accordance with the present invention, it is believed that other modifications, variations, and changes will be suggested to those skilled in the art in view of the teachings set forth herein. It is therefore to be understood that all such variations, modifications, and changes are believed to fall within the scope of the present invention as defined by the appended claims.

We claim:

1. An imaging system for imaging objects, said system comprising:
   (a) an illumination source producing a light beam directed along an optical path toward said object;
   (b) a scan lens for focusing said light beam to a diffraction-limited configuration in a prescribed object plane, said scan lens having an external entrance pupil;
   (c) a scanner for scanning said light beam to move said diffraction-limited configuration in a pre-determined scan pattern on said object plane, said entrance pupil being located at said scanner;
   (d) said scan lens being movable relative to said object to achieve coarse focusing;
   (e) a focusing lens being movable relative to said scan lens to achieve fine focusing, said scanner being located between said focusing lens and said scan lens; and
   (f) a detector located to receive light from said object plane and a display to produce a signal from said detector.

2. An imaging system as claimed in claim 1 wherein said scan lens is in a fixed position relative to said object during fine focusing.

3. An imaging system as claimed in claim 1 wherein said focusing lens is located between said scanner and said light source.

4. An imaging system as claimed in claim 1 wherein there is a detection arm located between said scanner and said detector, said focusing lens being located between said scanner and said detection arm.

5. An imaging system as claimed in claim 1 wherein said focusing lens is located between said detector and said scanner.

6. An imaging system as claimed in claim 4 wherein said imaging system is a multi-photon or two-photon system.

7. An imaging system as claimed in claim 1 wherein said scan lens is a liquid immersion scan lens and there is an immersion liquid between said scan lens and said object when said system is operational.

8. An imaging system as claimed in claim 1 wherein said system is a confocal imaging system and there is a detection arm located between said scanner and said detector, said detection arm receiving light from said diffraction-limited configuration in said object plane, said detection arm having a pinhole and a focusing lens to obtain a focal point for confocal detection of said light returning from said object, said detector being located behind said pinhole, there being a beamsplitter located between said detection arm and said object, said beamsplitter directing light returning from said object into said detection arm.

9. An imaging system as claimed in claim 1 wherein said system is a non-confocal imaging system and there is a detection arm located between said detector and said object, said detection arm receiving light from said diffraction-limited configuration in said object plane.

10. An imaging system as claimed in claim 9 wherein said detection arm has a first condenser lens therein, said detector being located behind said first condenser lens.

11. An imaging system as claimed in claim 10 wherein there is a beamsplitter located between said object and said detection arm, said beamsplitter directing light returning from said object into said detection arm.

12. An imaging system as claimed in claim 11 wherein there is a scanning mirror to de-scan light returning from said object, said scanning mirror being located between said beamsplitter and said object.

13. An imaging system as claimed in claim 7 wherein there is a side wall surrounding said scan lens, said side wall extending between said scan lens and said object, said side wall having a substantial sealing relationship with said scan lens and said object to retain said immersion liquid of said liquid-immersion scan lens between said scan lens and said object.

14. An imaging system as claimed in claim 1 wherein said system is constructed to allow fine focusing during operation of said system to image said object.

15. An imaging system as claimed in any one of claims 1, 2 or 3 wherein said scan lens is a telecentric f*theta liquid-immersion scan lens.

16. An imaging system as claimed in any one of claims 1, 2 or 3 wherein said scan lens is a telecentric f*theta scan lens.

17. An imaging system as claimed in any one of claims 1, 2, 3 or 6 wherein said detector is a spectrally-resolved detector.

18. An imaging system as claimed in any one of claims 1, 2 or 3 wherein there are means for supporting said object to be imaged.

19. An imaging system as claimed in any one of claims 1, 2 or 3 wherein there is a support for said object to be imaged, said support being capable of moving said object relative to said system.

20. A imaging system as claimed in any one of claims 1, 2, 3 or 6 including a second condenser lens and a transmission detector placed on an opposite side of said object, said condenser lens and said transmission detector being coaxial with said scan lens, where light transmitted through said specimen is detected.

21. An imaging system as claimed in any one of claims 1, 2 or 3 wherein said illumination source is a laser.

22. An imaging system as claimed in any one of claims 1, 2 or 3 wherein a laser rejection filter is placed in front of said detector, said imaging system being a multi-photon or two photon imaging system whereby said illumination source is a short pulse laser to excite multi-photon or two-photon fluorescence respectively in said object.

23. An imaging system as claimed in any one of claims 1, 2 or 3 wherein said system is configured to be controlled by a computer.

24. An imaging system as claimed in any one of claims 1, 2 or 3 wherein said imaging system is a macroscope and said system can be operated to image an object in reflected light, transmitted light, fluorescence, photoluminescence or multi-photon fluorescence.

25. An imaging system as claimed in claim 7 wherein said immersion liquid is one of water or oil.

26. An imaging system as claimed in any one of claims 1, 2 or 3 wherein said diffraction-limited configuration is one of a spot or a line.

27. An imaging system as claimed in claim 5 wherein said system has a beam expander, said beam expander being located to expand said light beam prior to said light beam entering said beamsplitter.

28. An imaging system as claimed in claim 1 wherein said system is a multi-photon or two-photon system and said illumination source is a laser, there being a filter in front of said detector to filter said light beam.

29. An imaging system as claimed in claim 9 where said imaging system is a fluorescence imaging system and said beamsplitter is a dichroic beam splitter.

30. An imaging system as claimed in claim 9 wherein there is a filter used with said beamsplitter on a side toward said detector.

31. An imaging system as claimed in any one of claims 1, 2, 3 or 6 wherein said system is used in combination with one selected from the group of image guided surgery, image guided microsurgery, image guided photodynamic therapy, multi-photon fluorescence imaging, and for exciting a small volume inside a semi-conductor.

32. An imaging system as claimed in any one of claims 1, 2 or 3 wherein said object is a living body and said system takes images in-vivo.

33. An imaging system as claimed in any one of claims 1, 2 or 3 wherein said system is used in combination with surgery or microsurgery using a laser for cutting tissue.

34. An imaging system as claimed in any one of claims 1, 2 or 3 wherein said system is used in combination with surgery or microsurgery where said surgery or microsurgery has a short pulse laser to generate multi-photon absorption for cutting tissue.

35. An imaging system as claimed in any one of claims 1, 2 or 3 wherein said system is used in combination with a semi-conductor for optical beam induced current generation within said semi-conductor using a short pulse laser that results in multi-photon or two-photon absorption at a focus volume inside said semi-conductor.

36. An imaging system as claimed in any one of claims 1, 2, 3 or 6 wherein said light source is a laser, the intensity of said laser being adjustable and controllable to enable said imaging system to perform at least one of image guided microsurgery, image guided surgery, microsurgery, image guided photo dynamic therapy, multi-photon fluorescence imaging or to excite a small volume inside a semi-conductor.

37. An imaging system as claimed in any one of claims 1, 2, 3 or 6 wherein said light source is a laser and said object is a semi-conductor, said system being constructed to control an intensity of said laser, said laser being intense enough to test or repair said semi-conductor.

38. An imaging system as claimed in any one of claims 1, 2, 3 or 6 wherein said system is a multi-photon or two-photon imaging system and said light source is a laser, said object being a semi-conductor and said laser having a photon energy that is smaller than a bandgap energy of said semi-conductor.

39. An imaging system as claimed in any one of claims 1, 2 or 3 wherein the light source is one of an arc lamp, light emitting diode, white light and laser.

40. An imaging system as claimed in claim 5 wherein said imaging system is a multi-photon or two-photon system.

41. A method of imaging an object using an imaging system having an illumination source producing a light beam directed along an optical path towards said object, a scan lens having an external entrance pupil for focusing said light beam to a diffraction-limited configuration in a pre-scribed object plane, a scanner for scanning said light beam to move said diffraction-limited configuration in a pre-determined scan pattern on said object plane, a detector being located to receive light from said object plane and a display to produce a signal from said detector, said method comprising locating said entrance pupil at said scanner, locating said scanner between said scan lens and a focusing lens, moving said scan lens relative to said object to coarse focus said system, subsequently maintaining said scan lens in a fixed position relative to said object and moving said focusing lens relative to said scan lens to fine-focus said system.

42. A method of imaging an object using an imaging system having a laser as an illumination source that produces a light beam directed along an optical path toward said object, a scan lens for focusing said light beam to a diffraction-limited configuration in a prescribed object plane, said scan lens having an external entrance pupil, a scanner for scanning said light beam to move said diffraction-limited configuration in a pre-determined scan pattern on said object plane, a detector being located to receive light from said object plane and a display to produce a signal from said detector, an intensity of said laser being controllable, said method comprising locating said entrance pupil at said scanner, locating said scanner between said scan lens and a focusing lens, moving said scan lens relative to said object to coarse focus said system, subsequently maintaining said scan lens in a fixed position relative to said object and moving said focusing lens relative to said scan lens to fine-focus said system, controlling an intensity of said laser to use said system as an imaging system and as a laser guided surgery or microsurgery system, continuing to fine-focus said systems while operating said systems.

* * * * *